United States Patent [19]
Wormell et al.

[11] Patent Number: 5,491,642
[45] Date of Patent: Feb. 13, 1996

[54] CCD BASED PARTICLE IMAGE DIRECTION AND ZERO VELOCITY RESOLVER

[75] Inventors: Dean C. Wormell, Westford; Fred R. Huettig, Boston; Andrew J. Jankevics, Acton, all of Mass.; Michael Winter, New Haven, Conn.; James L. Sopchak, Arlington, Mass.

[73] Assignee: United Technologies Corporation, Hartford, Conn.

[21] Appl. No.: 162,507

[22] Filed: Dec. 3, 1993

[51] Int. Cl.$^6$ ........................................ G01P 5/18
[52] U.S. Cl. .................. 364/509; 364/510; 356/28
[58] Field of Search ...................... 364/509, 560, 364/510; 356/28; 264/13; 250/227.16; 252/301.35

[56] References Cited

U.S. PATENT DOCUMENTS

| | | | |
|---|---|---|---|
| 4,176,950 | 12/1979 | Franke | 356/28 |
| 4,201,467 | 5/1980 | Hartmann et al. | 356/28 |
| 4,729,109 | 3/1988 | Adrian et al. | 364/560 |
| 4,730,247 | 3/1988 | Takahara | 364/560 |
| 4,864,515 | 9/1989 | Deck | 364/516 |
| 4,866,639 | 9/1989 | Adrian | 364/525 |
| 4,895,442 | 1/1990 | Boutier et al. | 356/28 |
| 4,988,191 | 1/1991 | Adrian et al. | 356/28 |
| 5,000,566 | 3/1991 | Kuppenheimer, Jr. et al. | 356/28 |
| 5,011,278 | 4/1991 | Farrell | 356/28 |
| 5,124,071 | 6/1992 | Katz | 252/301.35 |
| 5,153,665 | 10/1992 | Weinstein | 356/28 |
| 5,170,060 | 12/1992 | Maillard et al. | 250/560 |
| 5,180,921 | 1/1993 | Moreau et al. | 250/554 |
| 5,229,041 | 7/1993 | Katz | 264/13 |
| 5,324,956 | 6/1994 | Fagan et al. | 250/573 |
| 5,326,969 | 7/1994 | Fagan et al. | 250/227.16 |
| 5,333,044 | 7/1994 | Shaffer | 356/28 |

OTHER PUBLICATIONS

"Interrogation System for Particle Image Velocimetry", TSI, 4 pages (Copyright 1990).
"Laserpulse Flow Imaging Systems for PIV", TSI, 4 pages (Copyright 1992).
"Particle Image Velocimetry", FFD, 4 pages.
"A Particle Image Velocimetry System Using a High Resolution CCD Camera", D. C. Wormell and J. L. Sopchak, Jul. 1993, UTAOA, 8 pages.

Primary Examiner—Ellis B. Ramirez
Assistant Examiner—Patrick J. Assouad
Attorney, Agent, or Firm—Dominic J. Chiantera

[57] ABSTRACT

A PIV system provides a bias velocity component to each flow field speckle pattern recorded on a video array by rastering each corresponding recorded electrical image pattern by a select number of raster lines in the time interval prior to recording a succeeding speckle pattern image, thereby providing a calibrated spatial offset between recorded images.

13 Claims, 5 Drawing Sheets

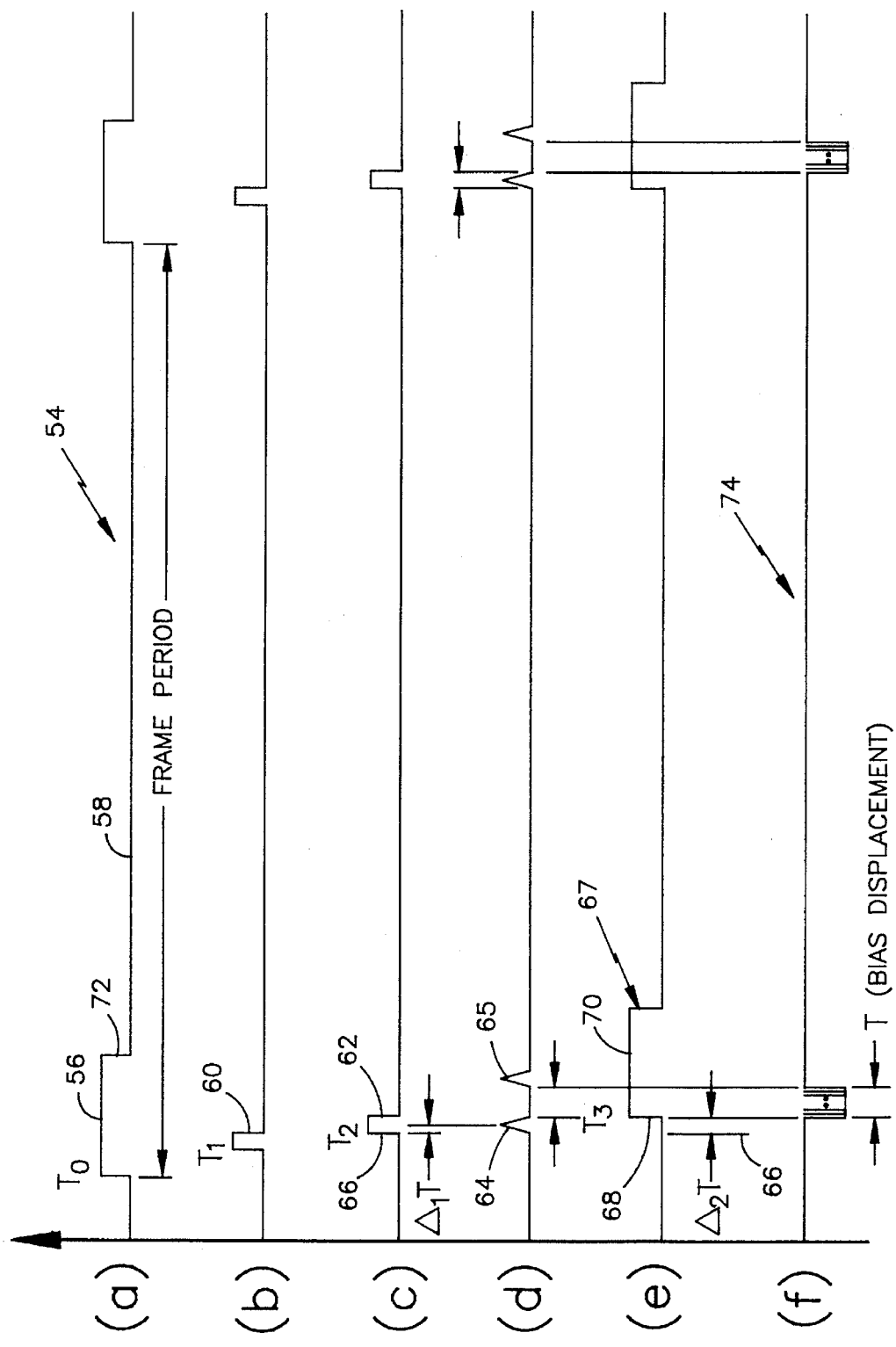

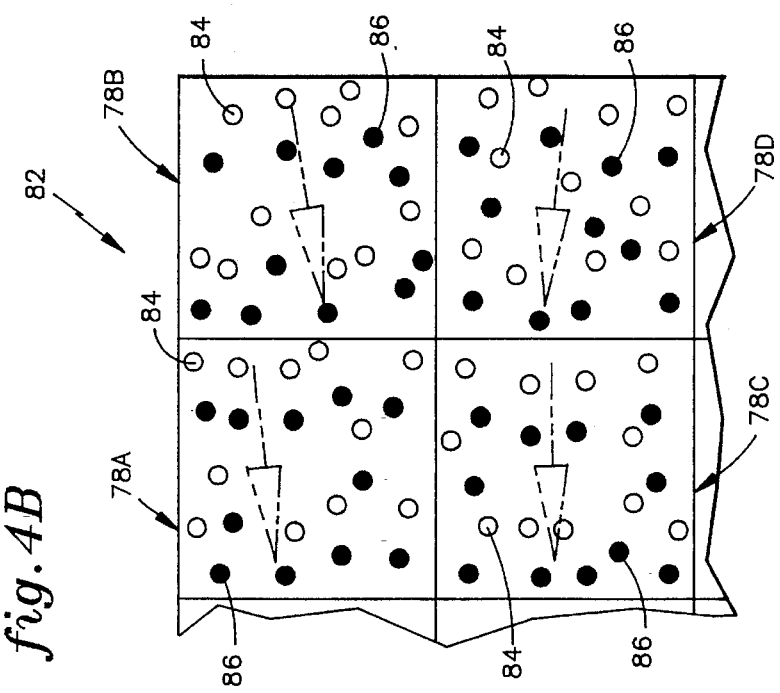
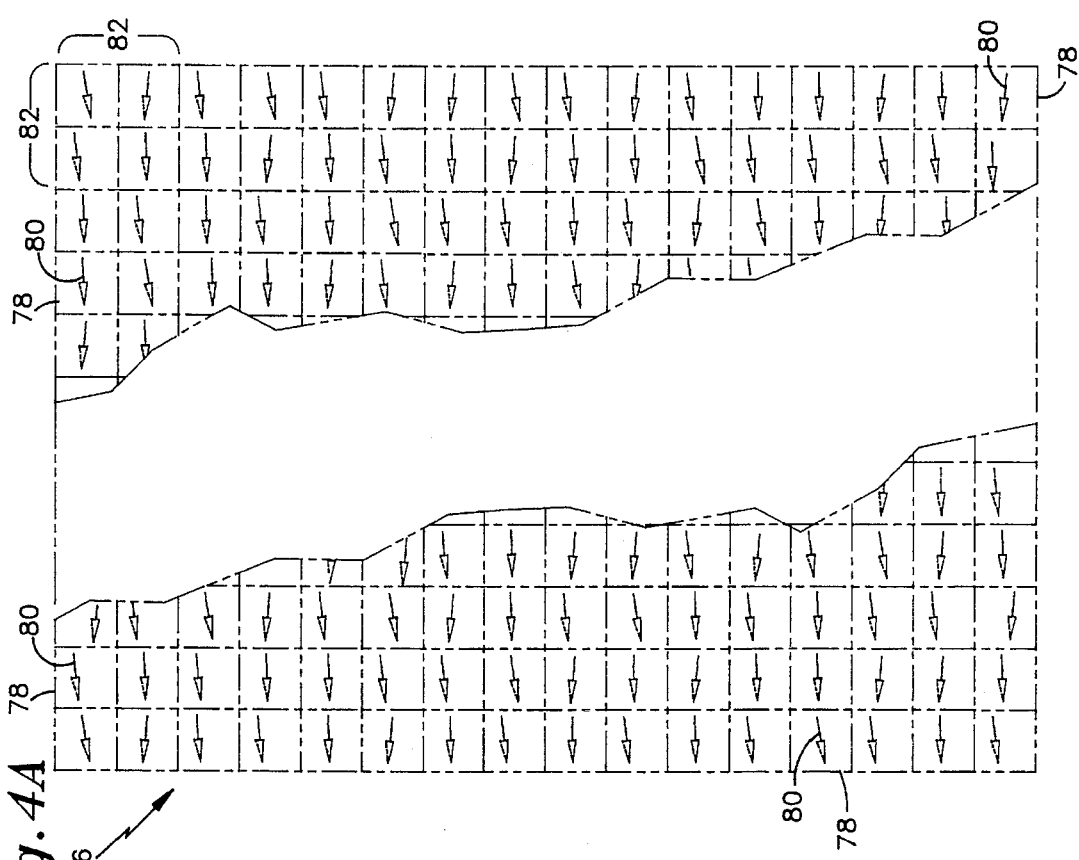

CCD BASED PARTICLE IMAGE DIRECTION AND ZERO VELOCITY RESOLVER

TECHNICAL FIELD

This invention relates to fluid flow velocity measurement, and more particularly to particle image velocimetry (PIV) systems for two dimensional fluid flow analysis.

BACKGROUND ART

Particle image velocimetry (PIV) systems are well known for performing instantaneous, average velocity measurements of two-dimensional fluid flow fields. They provide quantitative information regarding the average flow velocity at multiple points in a plane at a given instant of time, which lends itself useful in the analysis of dynamic, transient flows.

PIV measurements, in the form of film or video images, are obtained by seeding the flow with small particles that are then repeatedly illuminated by a sheet of laser light at defined intervals in time, usually relative to some external trigger. Precise control of the time interval between laser sheet illuminations of the flow field is what produces the data for the system. There are several different methods for generating PIV images (e.g., double-exposed single-color laser illuminated, double-exposed dual-color laser illuminated). The method selected depends on the type of data reduction to be performed on the resulting image (e.g., autocorrelation, cross correlation). In the case of a double-exposed single-color image, the image is received and recorded via a recording medium, such as a CCD (charged coupled device) video camera, and analyzed by sub-regions using an autocorrelation based algorithm. The output of the autocorrelation algorithm is a group of peaks which represent possible average displacements of particle pairs in each sub-region of the image. These average displacements, when combined with the time interval (pulse spacing) between the laser pulses used in generating the image, provide the sub-region velocity information. The composite of all the sub-region velocities provide the flow field velocity.

One of the properties of autocorrelation based algorithms is that they map a physical displacement into a pair of symmetrical peaks in the result domain. These peaks are symmetrically located with respect to the center of the two-dimensional result domain. The magnitude of the displacement of each peak in a pair relative to the center of the result domain should be equal, but the direction each represents is 180 degrees apart. Without any a priori information relating to the general direction of a flow (i.e. for a given speckle pair, which of the two was illuminated first?) there is no information available to determine which peak in the pair is the proper directional result. This phenomena is referred to as velocity directional ambiguity.

Another problem related to double-exposed image processing results when the separation between particle pairs is small. With decreasing displacement of the image particles the associated peaks move closer to the center of the autocorrelation result domain. As the particle separation approaches zero, information is lost due to the presence of a singular central peak, which tends to be large enough in magnitude to swamp out the peak of interest.

One known method of compensating for these autocorrelation anomalies is to introduce a bias in the particle image data. This bias, in the form of a fixed spatial displacement, between data fields from successive flow field illuminations, produces a fixed velocity component which offsets the peaks in the autocorrelation domain and thereby facilitates peak selection and effectively increases the dynamic range of the instrument in the low velocity portion of its measurement range. These two items provide the means to remove the velocity directional ambiguity (including recirculating flows), as well as distinguishing low velocity flow components.

The prior art method of introducing this bias is disclosed in U.S. Pat. Nos. 4,866,639 and 4,988,191 to Adrian et al. In each patent the bias displacement is achieved by optically shifting, in real time, the beam trajectory of successive scattering site images to spatially offset the point of incidence of a succeeding return image on a recording surface (photographic film or video medium) from the incident point of a preceding return image.

In the '639 patent optical shifting occurs mechanically by reflection of the second (and succeeding) images from the surface of a rotatable mirror having selectably different angles of reflection for succeeding images. In U.S. Pat. No. 4,988,191 the return images pass through a birefringent crystal which, subject to an applied bistable electric field, produces a different angle of refraction for each image in a pair of images, thereby providing a comparable spatial offset between the point of incidence of each image at the recording surface.

In each method the real time trajectory of the image is altered to create the displacement at the incident surface. This displacement has a tolerance due to the tolerances associated with the optical and mechanical elements used to alter the beam trajectory. This tolerance translates to a velocity error which becomes increasingly significant as flow velocity decreases.

DISCLOSURE OF INVENTION

One object of the present invention is to provide a PIV system which overcomes the limitations of prior art velocity bias methods. Another object of the present invention is to provide a PIV system with improved measurement accuracy.

According to the present invention, a PIV system for measuring the velocity of seeded particles in a fluid flow includes a gate signal actuated light source for periodically emitting light pulses to illuminate the speckle pattern of seeded particles in the fluid, a video camera having a gate signal actuated shutter and a line shiftable array, and a signal processor for providing gate signal actuation of the light source and camera shutter to cause the video camera to receive and record the light impulses of each illuminated speckle pattern image as a pattern of electrical charge on the array, the signal processor further providing, in the interval between light pulses, a raster signal to cause the camera to shift the recorded electrical charge pattern a select number of pixel lines in a plane perpendicular to, and away from, the point of incidence of the next received speckle pattern image, so as to provide a calibrated velocity bias between successive recorded speckle pattern images.

In further accord with the present invention, the raster signal from the signal processor commands the camera to shift the present recorded electrical impulse pattern, one pixel line at a time, from the array to a plurality of shift registers, thereby accurately inserting a precise pixel bias in the electronic storage of the first image. In still further accord with the present invention, the incorporation of the velocity bias as a consequential step in the signal processing of the recorded electrical image allows the present PIV system to provide a calibrated bias between all received images, without differentiation as to whether a recorded image is first or second in each double exposure sequence. In still further accord with the present invention, the camera shutter is closed between succeeding illuminated speckle pattern images, thereby minimizing exposure of the camera array to stray light, and increasing the signal to noise ratio of the recorded electrical impulse pattern.

The PIV system of the present invention does not optically alter the beam trajectory of the return image to offset the image field, nor does it provide any optical displacement of the image field. All scattering site images are received as emitted from the scattering site and recorded in real time as electrical impulses on a CCD camera array. Each electrical image is then rastered through the array by a number of pixel lines prior to recording the next succeeding image. This provides a known electrical displacement between each recorded image data set, without differentiation as to whether the image data is from the first or succeeding pulse, and without the offset ambiguity inherent in the tolerances of the optical shifting devices.

These and other objects, features, and advantages of the present invention will become more apparent in light of the following detailed description of a best mode embodiment thereof, as illustrated in the accompanying Drawing.

BRIEF DESCRIPTION OF DRAWINGS

FIG. 3 is a waveform illustration used in combination with the diagram of FIG. 2 to describe the operation of the PIV system of FIG. 1;

FIG. 4A is a partially broken away illustration of a display format used to display PIV data in the PIV system embodiment of FIG. 1;

FIG. 4B is an illustration of a magnified segment of the display format of FIG. 4A.

BEST MODE FOR CARRYING OUT THE INVENTION

Figure 1:
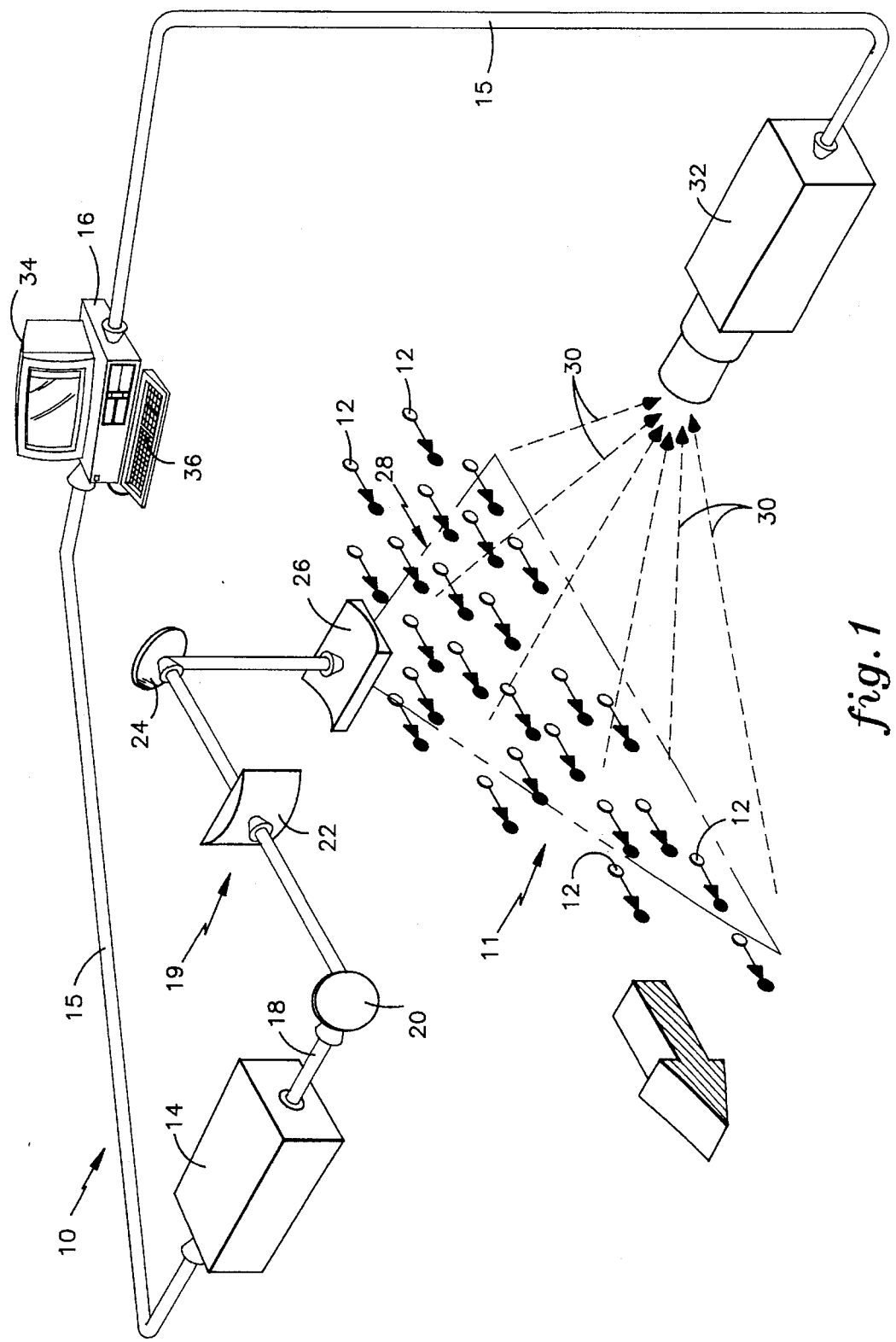
FIG. 1 is a figurative illustration of the elements of a best mode embodiment of a PIV system according to the present invention.

FIG. 1 is a figurative block diagram illustration of the PIV system 10 of the present invention for measuring the velocities of a fluid flow 11. The fluid, which may be gas or liquid, is seeded with light reflective particulate 12. The type of particulate used depends on the flow media and the measurement conditions (the seed material should not alter the flow field conditions you are trying to measure). Some typical materials include Alumina Oxide, Latex particles, Polystyrene, Water vapor, and microspheres. The particulate creates a visible particle flow which allows detection of the various flow patterns within the fluid, e.g. vortices, etc..

As known to those skilled in the art, PIV analysis of fluid velocity produces a vector whose direction and magnitude represent that of the average fluid velocity. In operation, successive speckle pattern images of the particle seeded flow field are recorded in real time on video or on photographic medium and the particle displacement between images is analyzed using an autocorrelation algorithm. The algorithm calculates individual average displacements for each of a plurality of sub-regions of the recorded image fields to produce the vector representation of the fluid velocity magnitude and direction in each sub-region. Collectively, the velocity vectors of all sub-regions represent the average fluid velocities across the interrogated region of the flow field.

Measurements are performed in one plane of the flow and the size of the fluid flow area to be interrogated determines the size of the light sheet required for illumination. A light source 14, with associated light sheet optics described hereinafter, provides the light sheet. The source 14 may be any one of a number of commercially available lasers, such as Nd:YAG, diode, Cu Vapor, diode pumped, Argon, or ruby, or even an Xenon flash lamp. The source provides two output light pulses separated by an interval time ($\Delta t$). The parameters to be considered in selecting a source is the minimum interval time, the light pulse energy, the optical energy loss, and the pulse width. The pulse width must be capable of freezing particle motion and, $\Delta t$ must be capable of capturing a double exposed image of the flowing particles within the bounds of a sub-region of the image. In the present embodiment the source in an Nd:YAG laser with double pulsed capability. As described hereinafter with respect to FIG. 2, a Q-switch controlled by a gate signal provided to the source on lines 15 from the system signal processor 16 provides the double pulse capability. Suitable Nd:YAG lasers are available from Spectra-Physics and Continuum Inc..

The laser output is a pulsed light beam 18 which is optically expanded to the desired size light sheet through light sheet optics 19. The elements of the light sheet optics vary with the particular application, but the embodiment of FIG. 1 is typical. In FIG. 1 the light sheet optics include a turning mirror 20 which reflects the laser pulsed beam 18 through a cylindrical focusing lens 22. The lens 22 focuses the pulse onto a second turning mirror 24 which reflects the light to a cylindrical expanding lens 26. The expanding lens spreads the point light beam into a light sheet 28 and focuses the sheet onto the flow field area to be interrogated. The illumination area of the light sheet can be varied by adjustment of the focusing lens. A typical minimum to maximum sheet size for a 2048×2048 pixel camera with a standard imaging lens is 1×1 cm to 20×20 cm depending on the detail of flow structure one wishes to measure.

The speckle pattern image 30 reflected back (back scattered) from each light sheet is received by a video recorder 32. Preferably the recorder is a high resolution, charge coupled device (CCD) camera having a 2K by 2K (2048× 2048) pixel array with 8 bits per pixel resolution. The camera has a gate signal actuated shutter, which is preferably a liquid crystal array but which may comprise any fast response shutter mechanism known to those skilled in the art. Similarly, it should be understood that any of the various other types of video recording devices which may be deemed suitable by those skilled in the art for a particular application may be used in the present PIV system. The camera 32 receives the light impulses of the speckle pattern images which pass through the shutter directly, in real time, and records the image as a corresponding pattern of electrical charge on the receiving surface of the CCD array.

The novelty of the present PIV system is in its manner of introducing the bias velocity. In the present invention the electrical charge pattern of each speckle pattern image received is immediately shifted (or rastered) away from the received image's point of incidence on the array. The shift occurs in the interval between light sheet illuminations and consists of rastering the stored charge pattern by a select number of pixel (or raster) lines. As a result the electrical charge pattern of the next received speckle pattern image is offset from the prior pattern by a calibrated distance.

Figure 2:
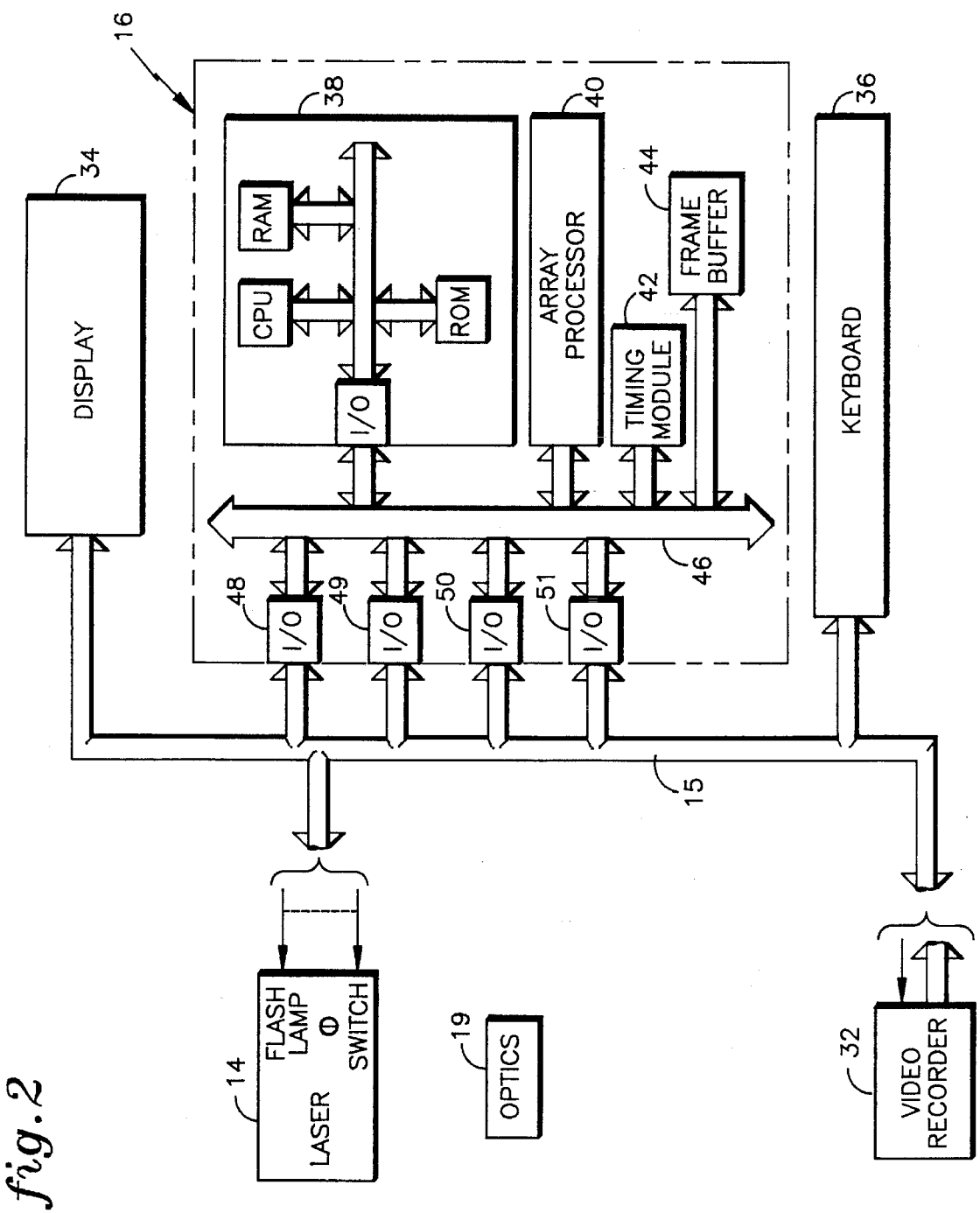
FIG. 2 is a simplified system block diagram illustration of the PIV system embodiment of FIG. 1.

In FIG. 1, control of the light source 14 and camera 32 is provided by the system signal processing means, including the signal processor 16, the display 34, and keyboard 36. The signal processor 16 may be a commercially available personal computer, such as a DOS based PC with an INTEL model 80486 microprocessor. The display 34 is a standard SVGA monitor with a 256 color video driver, and the keyboard 36 is a standard full keyset. Referring to FIG. 2, in the present PIV system application the processor 16, in addition to its CPU module 38, also includes an array processor module 40, a PIV timing generation module 42 (ISA bus compatible), and a frame grabber module 44, such as the RETICON/AOA Model SB4000.

The array processor 40 may comprise one or more ISA Bus compatible, i 860 based µprocessors, which reduce the time required by the PC to perform the PIV autocorrelation algorithm. All of the system processor modules are interconnected through a processor bus 46 with each other and through input/output (I/O) devices 48–51 and the system interconnect lines 15 to the laser light source 14, video recorder 32, display 34, and keyboard 36.

The PIV system software, which preferably rims in an MS Windows™ environment, performs four functions: (i) Data Acquisition and Control, (ii) PIV Image Data Processing, (iii) Display Control, and (iv) Data Reporting. In system operation, the Data Acquisition and Control software controls the video camera's shutter, the camera's offset calibration, and the speckle pattern image exposure. The image exposure is the coordination of the pulsing/firing of the laser pulse with the opening and closing of the shutter. The laser light pulse controls the amount of light directed to the measurement region and the LCD shutter opening controls the background rejection level. The offset calibration relates to the removal of DC offsets inherent in CCD imaging cameras. The Acquisition and Control software also controls the firing of the light source.

The timing module 42 provides the system timing for coordinating the data acquisition commands, including the opening of the camera shutter, the readout of the camera array data, the laser flash lamp trigger, and the laser Q-switch delay trigger. FIG. 3 is a representative illustration of the timing events occurring in each data acquisition cycle. Waveform 54 of FIG. 3, illustration (a) is a bistable signal which controls the shutter opening. In the present embodiment, the shutter opens at time $T_0$ on transition of the signal to a logic one state 56, and closes on the signal's transition to the zero state 58. The shutter control signal period is referred to as the "frame period", which corresponds to the time required for the system to record the double exposure of the speckle pattern and to readout the data from the video array to the array processor 40. In the present embodiment, with a 2K×2K CCD array, the shutter open time is on the order of 100 msec and the frame period is approximately 1.0 second.

FIG. 3, illustration (b) is the flash lamp trigger signal 60 for the laser source 14 which occurs at time $T_1$, followed at time $T_2$ by the Q-switch trigger signal 62 of illustration (c). Illustration (d) shows the dual laser light pulses 64, 65, for each double exposure. The first pulse 64 reaches full output light intensity at time $\Delta_1 T$ following the leading edge 66 of the Q-switch trigger signal 62 (illustration (c)). Illustration (e) is the waveform 67 for the velocity bias control and the data readout. The bias velocity function is initiated on the waveform's leading edge transition 68 to the logic one state 70. In FIG. 3 this occurs at time $T_3$ following decay of the light intensity of the first laser pulse 64 to zero.

Knowing the laser pulse duration the T3 event can be scheduled at an incremental time $\Delta_2 T$ following the $T_2$ leading edge 66 of the Q-Switch trigger. This ensures that there is no remaining (residual) speckle pattern image to be captured by the video recorder, so that the present electrical charge pattern stored on the array can be raster shifted by a selectable number of pixel lines from the point of incidence of the original image on the array. Illustration (f) shows, with the waveform 74, shows the time T for performing a bias displacement in the image data. This time must be less than $\Delta\tau$-light pulse width in order to perform a velocity bias operation without "smearing" the captured image over multiple pixels on the CCD. The actual number of line shifts depends on a number of variables including the range of fluid velocities to be measured (which establishes the inter-pulse period between light pulses) and the response time of the array.

The shift direction of the charge pattern is in the plane of the array; which is nominally perpendicular to the trajectory of the speckle pattern image incident at the array. The PIV system software has a dialog box which can be used by an operator, through keyboard 36 entry, to select the bias displacement (number of pixel lines). For an array response time of $T_R$ and a bias displacement of N lines, the insertion time $T_I$ (time to execute the bias displacement) is equal to:

$$T_I = N \times T_R \qquad \text{(Equation 1)}$$

For an array response time $T_R$=25 µsec. and a range of bias displacement of 0<N<16, then $0 \leq T_I \leq 2.65$ msec.. The bias insertion time is also the minimum allowable interval time ($\Delta\tau$) between the dual light source pulses (64, 65, FIG. 3, illustration (d)), since the displacement must be completed before the second image is received at the array.

The response time $T_R$ is the time required for the CCD array to fully complete the shift of charge between two lines of pixels. This represents a full fidelity image transfer. If, for a given PIV application, the autocorrelation algorithm is capable of calculating the sub-region velocity vector magnitudes with less than a full fidelity image, the insertion time can be reduced. This reduction may be quantified with the introduction of a bias execution factor. This factor is a whole number which ranges from zero to one digit less than the system's maximum bias displacement. For an actual bias displacement of N lines and a bias maximum of M lines, the bias execution factor ranges from 0 to M–1, and the insertion time is:

$$T_I = N \times T_R \times \{(M - \text{Bias Execution Factor})/M\} \qquad \text{(Equation 2)}$$

As an example, assume a PIV measurement which is set-up with a magnification factor of 5 (i.e. a pixel from the 2048×2048 array which is 13.5 µm×13.5 µm at the CCD chip surface is imaged as 67.5 µm×67.5 µm at the light sheet (11, FIG. 1), also includes a $\Delta\tau$=100 µsec. This means that a fluid particle which is being spatially displaced in the light sheet by 5 mm between light pulses is moving at a velocity of 50 meters per second in the flow. Assuming this 50 meters per second is the mean flow velocity in the X direction and there are flow field variations of +/–2.5 meters per second in the Y direction, we choose a predominant bias velocity of 5 meters per second in the Y direction which is approximately 8 pixel lines of bias displacement (5 m/s. at 100 µsec is 0.5 mm displacement in the light sheet, which is equivalent to 7.4 pixels (lines) at 67.5 μm/pixel). To ensure that we satisfy the condition of T<100 μsec, we set N=8 and the bias execution factor at 10, such that:

$$T_f=(8)\times(16-10)\times(1/16)\times25 \; \mu sec=75 \; \mu sec<100 \; \mu \; sec$$

Data processing begins when the Frame Period is complete. The system software PIV Image Data Processing software captures the frame of data from the video recorder by requesting a frame grab. The transfer cannot be initiated until the shutter closes (the trailing edge 72 of the shutter control signal, FIG. 3, illustration (a)) on the next succeeding data acquisition cycle. The data readout then occurs beginning with the trailing edge 74 of the bias and readout control signal (67, FIG. 3, illustration (e)). The data is loaded into the frame buffer 44 (FIG. 2) for analysis.

The analysis of the full data frame image field is performed in sub-regions, to provide sub-region velocity vectors. The size of the sub-region is directly proportional to the magnitude of the fluid velocity to be measured. Typically, the sub-region velocity vector magnitudes range from 32×32 pixels (minimum) to 128×128 pixel (maximum) for a typical range of measured fluid velocities of from 0.1 to 2.0 meters per second in water and 10 to 500 meters per second in air. A full frame (2048×2048 pixel) image field will, therefore, produce a displayed vector array ranging from 64×64 to 16×16 vectors, respectively.

The algorithm which is applied to each image sub-region to compute the average velocity for that area is performed as follows:

1. Compute the average pixel value for the sub-region;
2. Subtract this average value from each pixel in the sub-region;
3. Perform an autocorrelation (two 2 dimensional Fast Fourier transforms) on the result of step 2;
4. Blank out the central peak of the autocorrelation;
5. Search for the maximum magnitude pixel in the autocorrelation;
6. Fit a small sub-region around this peak to a circle to determine the center of the spot which contains the peak;
7. Do the same thing for the companion spot to the one found containing the maximum;
8. Average the displacement of these two spots relative to the center of the autocorellation;
9. Report this value as the average displacement (in pixels) for the given sub-region; and
10. Convert from pixels to m/s based on user defined inputs for the measurement parameters.

With the signal processor of the present embodiment, the algorithm performed the above analysis for each 128×128 pixel sub-region of a 2048×2048 (total 16×16 vectors) at a rate of 0.2 seconds/vector, and for 64×64 pixel sub-regions of the same image field the rate was 0.12 seconds/vector.

FIG. 4A is a partially broken away illustration of a display 76 of the calculated sub-region vectors in an M×M matrix format. The display is a composite of the image sub-regions 78, each with its corresponding velocity vector 80. Collectively, the vectors provide a quantitative illustration of the flow velocities throughout the captured field of view. The operator may command, through keyboard 36 (FIG. 2), the simultaneous display of the calculated magnitude and angular direction of the vectors, thereby allowing for quantitative analysis of each sub-region velocity.

The operator may also select simultaneous display of the vectors superimposed on the recorded double exposure of the speckle pattern image, as shown in the FIG. 4B exploded view of the quartet 82 of sub-regions in FIG. 4A. In FIG. 4B, the first exposure particle images of sub-regions 78A–78D are illustrated by hollow dots 84 and the second exposure particle images by solid dots 86. As known to those skilled in the PIV art, the autocorrelation algorithm requires a minimum number of particle pair images to accurately calculate the sub-region vector magnitude. FIG. 4B is only representative of this number which, for ease of illustration, are shown to be equal to 11 pairs in each region. It should be understood, however, that the actual number of particle pairs in each sub-region is random, and that the minimum number required for each region may be less.

Figure 5:
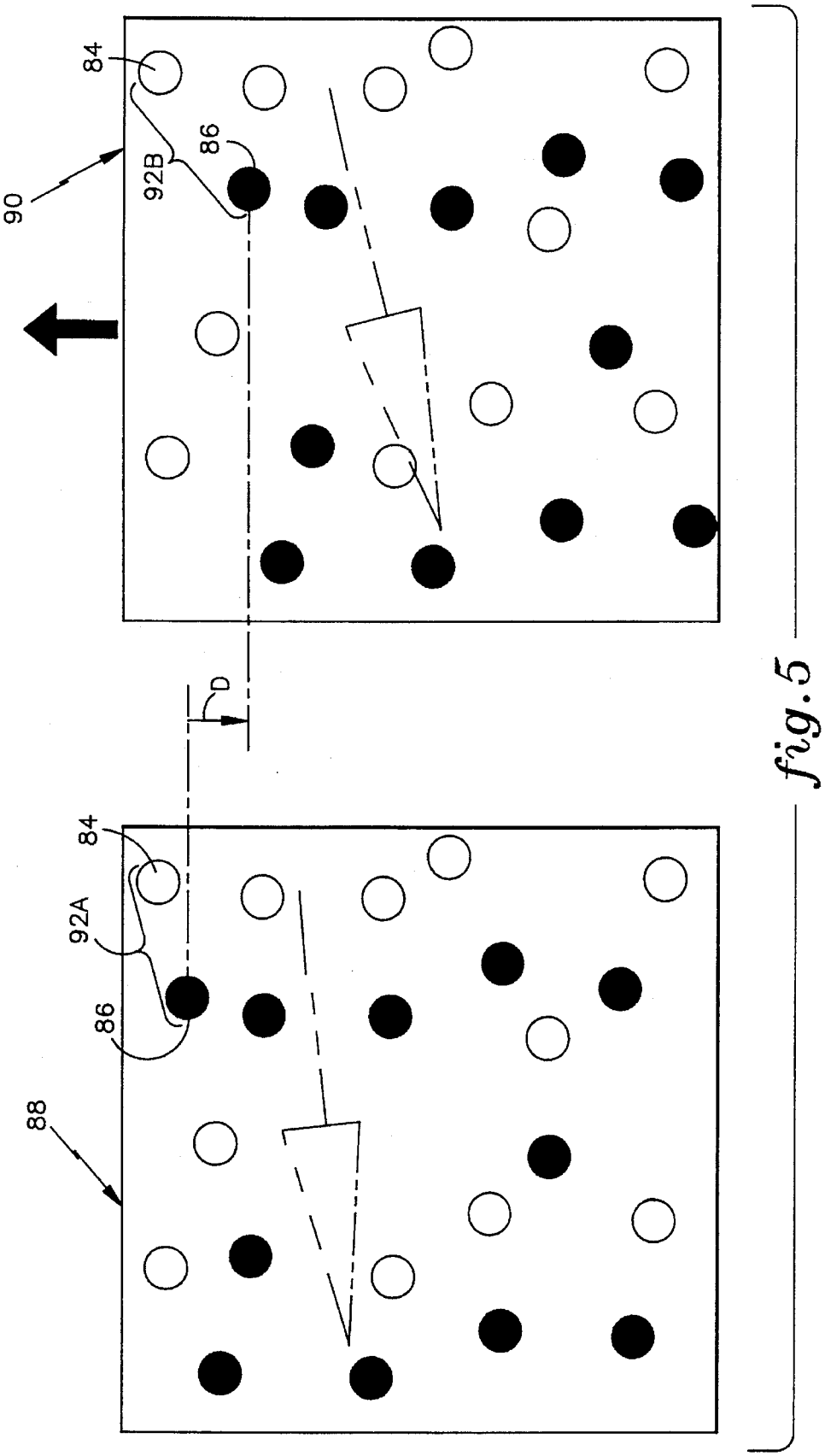
FIG. 5, illustrations (A) and (B), are used to provide a figurative comparison of double exposed speckle images with and without the bias displacement feature of the present invention.

The novelty of the present PIV system is the manner in which the particle images of the first exposure speckle pattern are shifted by a selected number of pixel lines prior to the receipt and recording of the second image of each pair. FIG. 5 demonstrates this shift in a comparative illustration of the same double exposed speckle pattern image in a non-shifted sub-region 88 versus a shifted sub-region 90. In each sub-region the first exposure particles are again shown by the hollow dots 84 and the second exposure particles by the solid dots 86. The received double exposure image pattern is the same in each illustrated sub-region, however, the recorded first exposure image data for sub-region 90 was shifted in the plane of the recorder array in the direction of the arrow 92, perpendicular to the incident trajectory of the image on the array. The first exposure particles 84 are shown arrayed in the same location and pattern in both sub-regions, however, the second exposure particles 86 of region 90 are shown displaced from the locations of their counterpart particles 86 of region 88. The particle pair offsets in region 88 are due solely to spatial displacement of the flowing particles in the fluid (i.e. actual fluid velocity) during the interpulse period ($\Delta\tau$) while the offset between particle pairs in sub-region 90 is the summation of the actual fluid velocity and the bias offset. The bias offset is illustrated for the particle pair 92A of region 88 and its corresponding pair 92B of sub-region 90, as equal to distance D.

The bias displacement occurs in the plane of the array. The actual direction of the shift is immaterial, and may be determined by specific application. For a single array segment the image is shown to be shifted in a single direction, however dual segment arrays may also be used. As known, in a dual segment array in which the segments are adjacently placed to form an integral receiving surface, each segment receives and records a portion of the total incident image. Each segment's recorded image portion is simultaneously line shifted and digitized, thereby reducing the time required to clear the display. The digitized image may then be reassembled in memory. In the case of bias displacement, the dual segment array similarly reduces the insertion time for offsetting the image by allowing the dual segments to be shifted simultaneously. In this case the shifting occurs in two directions simultaneously; both in the plane of the array.

Although the invention has been shown and described with respect to a best mode embodiment thereof, it should be understood by those skilled in the art that various changes, omissions, and additions may be made to the form and detail of the disclosed embodiment without departing from the spirit and scope of the invention as recited in the following claims.

We claim:

1. Apparatus for reporting the magnitude and direction of fluid velocities in a flowing fluid having light reflective particles disposed therein, comprising:

light source means, for providing light pulses to periodically illuminate the light reflective particles at the pulse repetition rate of a gate signal presented thereto, to provide an optical speckle pattern image representative of the spatial position of the particles in the flowing fluid in each of two successive time intervals which are spaced in time by an interpulse period;

video recording means, having an array with a receiving surface for receiving each said optical speckle pattern image at a point of incidence thereon and for recording each received optical speckle pattern image as a corresponding electrical signal pattern, said video recording means shifting each said electrical signal pattern in said interpulse period from said point of incidence to a second position on said array major surface which is displaced from said point of incidence by a spatial increment whose value is determined by the magnitude of a bias displacement signal presented thereto; and signal processor means, responsive to said light source means and to said recording means, and having keyboard means responsive to operator control, for providing said gate signal to said light source means and for providing said bias displacement signal to said video recording means, respectively, at a pulse repetition rate and bias magnitude selected by an operator to shift said recorded electrical signal pattern by a known velocity bias value in said interpulse period.

2. The apparatus of claim 1, wherein:

said signal processor means further comprises memory means for storing signals representative of a vector autocorrellation algorithm, said processor means utilizing said autocorrellation algorithm to analyze successive stored electrical signal patterns to determine the direction and magnitude of the fluid velocities in subregions of the fluid flow field, said processor means providing a calculated flow velocity magnitude and a calculated flow direction for each said subregion.

3. The apparatus of claim 2, wherein said calculated flow velocity magnitude is net of said known velocity bias value.

4. The apparatus of claim 2, wherein:

said signal processor means further comprises display means for displaying signal information; and wherein said signal processor means displays said calculated flow velocity and said calculated flow direction for each fluid field subregion as a vector.

5. The apparatus of claim 1, wherein:

said video recording means further includes a gate signal actuated shutter means, said shutter means admitting light impulses to said array in response to a first state of a bistable shutter gate signal presented thereto from said signal processor means.

6. The apparatus of claim 5, wherein said shutter means comprises a liquid crystal panel.

7. The apparatus of claim 1, wherein said video recording means is a charge coupled device (CCD) video camera.

8. The apparatus of claim 7, wherein said array receiving surface comprises a plurality of pixel elements disposed in lines, each line spaced at a known spatial distance from adjacent lines; and wherein said signal processor means provides said bias displacement signal magnitude as a numerical quantity corresponding to a number of said pixel lines, said video recording means shifting a recorded electrical signal pattern by the number of pixel lines represented by said displacement signal, so as to provide a known spatial increment shift in said pattern.

9. The apparatus of claim 8, wherein said plurality of pixel elements are disposed in a matrix of rows and columns, each of said rows being spaced at a known spatial distance from adjacent ones thereof.

10. Apparatus, for reporting the magnitude and direction of fluid velocities in a fluid flow having particles disposed therein, comprising:

light source means, for illuminating a test region of the fluid flow with pulsed light at a pulse repetition rate controlled by a gate signal presented thereto, to create optical images of the speckle pattern of the light reflected from the particles in each of two successive time intervals spaced in time by an interpulse period, each optical image indicating the spatial position of the particles in the flow in the associated time interval and successive optical images indicating the time lapsed displacement of the particles in the flow;

video recording means, having aperture means for receiving each said optical image at a point of incidence on a receiving surface of an array therein and for recording the speckle pattern of each optical image as a corresponding electrical signal pattern and, in response to a bias signal presented thereto, for shifting the position of each recorded electrical signal pattern from said point of incidence to a displaced position offset therefrom by a distance determined by the magnitude of said bias signal; and signal processor means, having keyboard means responsive to operator control for providing said gate signal to said light source means and for providing said bias signal to said video recording means, each respectively at a pulse repetition rate and a bias magnitude selected by an operator, and having memory means for storing signals representative of a vector autocorrellation algorithm, said processor means being responsive to each said recorded electrical signal pattern for applying said autocorrellation algorithm to successive ones of said recorded electrical signal patterns to provide a calculated flow direction and a calculated flow velocity magnitude in dependence on the time lapsed displacement value of the particles in successive optical images.

11. The apparatus of claim 10, wherein said signal processor means calculates said time lapsed displacement value as the net value of the detected particle displacement over successive optical images minus the magnitude of said bias signal.

12. The apparatus of claim 11, wherein said signal processor means provides said calculated flow direction and said calculated flow velocity magnitude in each of a plurality of subregions of said test region.

13. The apparatus of claim 10, wherein:

said signal processor means further provides a shutter command signal to said video recording means in said interpulse period; and wherein said aperture means further comprises shutter means for closing said aperture to prevent incidence of said optical images on said array in the presence of said shutter command signal.

* * * * *